(12) United States Patent
Becker et al.

(10) Patent No.: US 12,704,162 B2
(45) Date of Patent: Aug. 11, 2026

(54) BALL SCREW DRIVE FOR AN ACTUATOR GROUP

(71) Applicant: ZF Active Safety GmbH, Koblenz (DE)

(72) Inventors: Marco Becker, Oberduerenbach (DE); Michael Weins, Muenstermaifeld (DE); Jonathan Bockmuehl, Melsbach (DE); Christophe Jean Daniel Beyer, Weitersburg (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 18/593,556

(22) Filed: Mar. 1, 2024

(65) Prior Publication Data

US 2024/0301931 A1 Sep. 12, 2024

(30) Foreign Application Priority Data

Mar. 7, 2023 (DE) ......................... 102023105666.2

(51) Int. Cl.
*F16D 65/16* (2006.01)
*F16H 25/22* (2006.01)
(Continued)

(52) U.S. Cl.
CPC ......... *F16D 65/16* (2013.01); *F16H 25/2214* (2013.01); *F16H 25/24* (2013.01);
(Continued)

(58) Field of Classification Search
CPC ................. F16D 2125/40; F16D 65/16; F16D 2200/0017; F16D 2200/0021;
(Continued)

(56) References Cited

U.S. PATENT DOCUMENTS 3,132,719 A 5/1964 Cole
9,328,809 B2 * 5/2016 Rehfus ................ F16H 25/2204
(Continued)

FOREIGN PATENT DOCUMENTS

CN 113883196 A * 1/2022
DE 102017121942 A1 * 3/2019 .............. B60T 13/10
(Continued)

OTHER PUBLICATIONS

Machine translation of CN 113883196 (Year: 2022).*
(Continued)

*Primary Examiner* — Randell J Krug
(74) *Attorney, Agent, or Firm* — Kristin L. Murphy

(57) ABSTRACT

A ball screw drive for an actuator assembly of a vehicle brake is disclosed, having a rotatably mounted recirculating ball screw spindle, on which a spindle nut open on one side is mounted. At least one thread groove is formed on the circumferential surface of the recirculating ball screw spindle, and a corresponding thread groove is formed on the inner surface of the spindle nut. A multiplicity of balls is guided in the thread grooves in such a way that rotation of the recirculating ball screw spindle brings about axial movement of the spindle nut along a rotational axis of the recirculating ball screw spindle. The spindle nut is manufactured from rolling bearing steel or from C steel.

10 Claims, 2 Drawing Sheets

(51) Int. Cl.
*F16H 25/24* (2006.01)
*F16D 125/40* (2012.01)

(52) U.S. Cl.
CPC .. *F16D 2125/40* (2013.01); *F16D 2200/0021* (2013.01); *F16D 2250/0046* (2013.01); *F16H 2025/249* (2013.01)

(58) Field of Classification Search
CPC .. F16D 2250/0046; F16D 65/66; F16D 65/46; F16D 65/56; F16H 2025/249; F16H 25/2214; F16H 25/24
See application file for complete search history.

(56) References Cited

U.S. PATENT DOCUMENTS

| | | | | |
|---|---|---|---|---|
| 2003/0051569 | A1 * | 3/2003 | Kapaan .................. | F16D 65/18<br>74/424.82 |
| 2008/0110285 | A1 | 5/2008 | Pan et al. | |

FOREIGN PATENT DOCUMENTS

| | | | | |
|---|---|---|---|---|
| DE | 11 2008001105 | B4 | | 5/2019 |
| DE | 102022109506 | A1 | * | 10/2023 |
| EP | 1089008 | A2 | | 4/2001 |
| JP | H11325068 | A | | 11/1999 |
| JP | 2004076823 | A | | 3/2004 |

OTHER PUBLICATIONS

Machine translation of DE 102017121942 (Year: 2019).*
Machine translation of DE 102022109506 (Year: 2023).*
Rockford ball screw Inch ball screws (https://rockfordballscrew.com/ballscrews/inch/) (Year: 2022).*
Search Report dated Nov. 28, 2024 (10 pages); from German Patent Office for German Patent No. 102023 105 666.2.

* cited by examiner

BALL SCREW DRIVE FOR AN ACTUATOR GROUP

CROSS-REFERENCE TO RELATED APPLICATION

This application claims priority to German Priority Application No. 102023105666.2, filed Mar. 7, 2023, the disclosure of which is incorporated herein by reference in its entirety.

TECHNICAL FIELD

The disclosure relates to a ball screw drive for an actuator assembly of a vehicle brake, for example, for an electromechanically actuated brake. The ball screw drive has a recirculating ball screw spindle, on which a spindle nut is mounted.

BACKGROUND

In an actuator assembly for a vehicle brake, the spindle nut forms the brake piston. This means that the spindle nut projects partially into a gap of a brake caliper in order to apply a brake pad to a brake rotor.

When the vehicle brake is actuated, axial and radial forces cause surface pressures in the spindle nut, for example in the region of a thread groove and at an end which is remote from the gap and by which the spindle nut is supported axially against a bearing surface.

These surface pressures promote wear of the spindle nut.

SUMMARY

What is needed is a ball screw drive which can withstand the surface pressures which occur.

According to the disclosure, a ball screw drive for an actuator assembly of a vehicle brake is disclosed, having a rotatably mounted recirculating ball screw spindle, on which a spindle nut open on one side is mounted. At least one thread groove is formed on the circumferential surface of the recirculating ball screw spindle, and a corresponding thread groove is formed on the inner surface of the spindle nut, wherein a multiplicity of balls is guided in the thread grooves in such a way that rotation of the recirculating ball screw spindle brings about axial movement of the spindle nut along a rotational axis of the recirculating ball screw spindle. The spindle nut is manufactured from rolling bearing steel or from C steel.

Rolling bearing steel is distinguished by high hardness, wear resistance and dimensional stability, and a long life. A spindle nut manufactured from rolling bearing steel can thus withstand the surface pressures which occur in the actuator assembly for a sufficiently long time.

Rolling bearing steel refers to an inorganic metallic material with the number 1.3505 or 100Cr6.

C steel is extremely robust and dimensionally stable and also has good forming characteristics. By appropriate heat treatments, it is possible to achieve the strength and toughness of the C steel which are required for the application. Consequently, a spindle nut manufactured from C steel can likewise withstand the surface pressures which occur.

The spindle nut can have an anti-corrosion coating on the outside, at least on its end face and in a region of the circumferential wall adjoining the end face. In concrete terms, the spindle nut can have an anti-corrosion coating at least in the region which projects into a gap of the brake caliper and is thus exposed to environmental effects when the ball screw drive is used in an actuator assembly.

The anti-corrosion coating makes the spindle nut sufficiently resistant to environmental effects when it is used as a brake piston. The application of an anti-corrosion coating is advantageous in the case of a spindle nut manufactured from C steel since C steel is not rustproof.

The anti-corrosion coating is formed by an abrasion-resistant anti-friction coating, for example. In this way, the sliding properties of the spindle nut can simultaneously be improved by the anti-corrosion coating.

According to one exemplary arrangement, the circumferential wall of the spindle nut is completely coated with the anti-corrosion coating. This enables the coating process to be particularly simple. For example, the inner wall of the spindle nut can be covered by a plug during the coating process.

The spindle nut may be embodied without an anti-corrosion coating on the radial inner surface. This means that the spindle nut is free from an anti-corrosion coating in the region of the thread groove.

The spindle nut is hardened at least in the region of the thread groove. This additionally improves resistance to surface pressures.

The spindle nut is fully hardened and tempered, bainitized or inductively hardened, for example. Each of these alternatives is suitable for improving the resistance properties of the spindle nut with respect to surface pressures.

The disclosure furthermore relates to a brake piston for a vehicle brake which comprises a ball screw drive according to the disclosure, wherein the spindle nut of the ball screw drive forms the brake piston.

BRIEF DESCRIPTION OF DRAWINGS

Further advantages and features of the disclosure will be found in the following description and in the appended drawings, to which reference is made. In the drawings.

DETAILED DESCRIPTION

Figure 1:
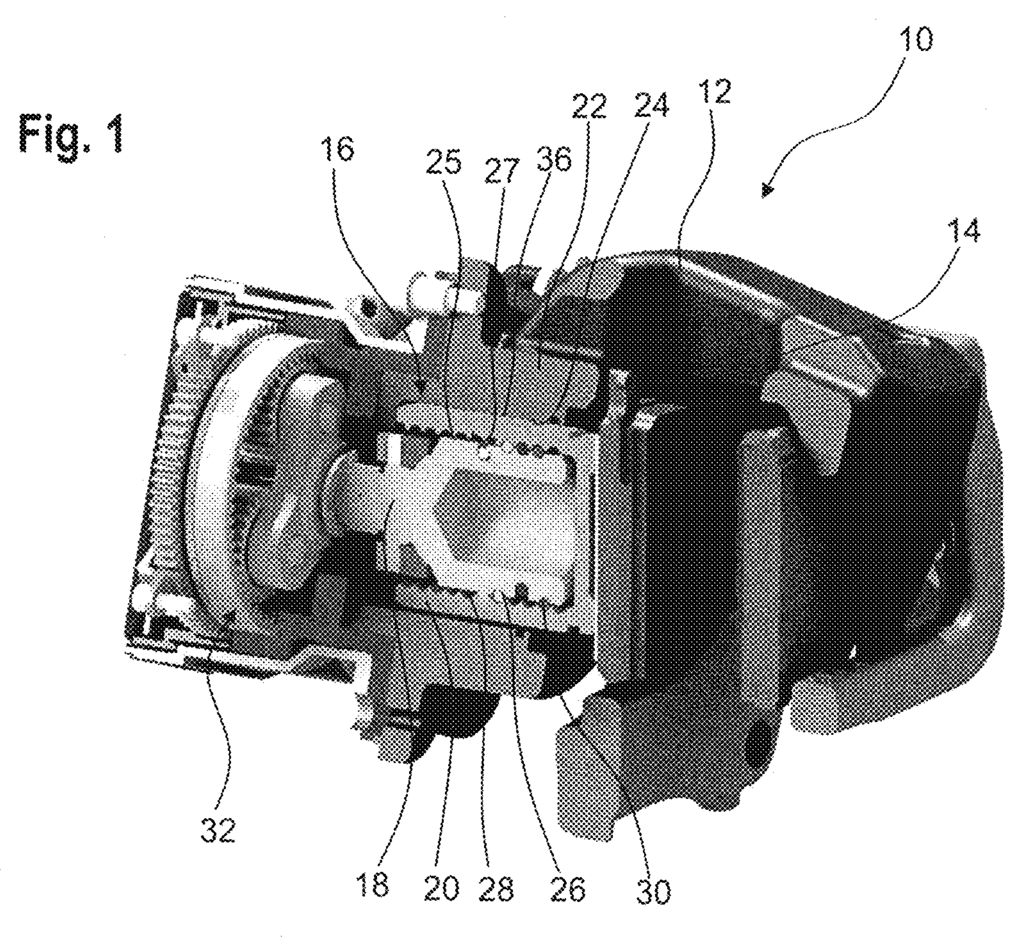
FIG. 1 shows an actuator assembly having a ball screw drive according to the disclosure.

FIG. 1 shows an actuator assembly 10 for a vehicle brake.

The actuator assembly 10 comprises a brake caliper 12, in which a gap 14 for a brake rotor is formed.

Moreover, the actuator assembly 10 comprises a ball screw drive 16, having a rotatably mounted recirculating ball screw spindle 18, on which a spindle nut 20 open on one side is mounted.

A sleeve-shaped section 22, on which a running surface 24 for the spindle nut 20 is formed, is formed in the brake caliper 12.

The spindle nut 20 forms a brake piston, which is used to apply a brake pad 21 to the brake rotor.

Axial movement of the spindle nut 20 is brought about by rotation of the recirculating ball screw spindle 18.

More specifically, at least one thread groove 26 is formed on the circumferential surface 25 of the recirculating ball screw spindle 18, and a corresponding thread groove 28 is formed on the inner surface 27 of the spindle nut 20, wherein a multiplicity of balls 30 is guided in the thread grooves 26, 28 in such a way that rotation of the recirculating ball screw spindle 18 brings about axial movement of the spindle nut 20 along a rotational axis of the recirculating ball screw spindle 18.

An electric motor (not visible in FIG. 1), which is coupled to the recirculating ball screw spindle 18 via a gear mechanism 32, is provided for driving the recirculating ball screw spindle 18.

The spindle nut 20 is manufactured from rolling bearing steel or from C steel.

As can be seen in FIG. 1, the spindle nut 20 projects into the gap 14 and thus has an exposed outer surface in one section. The exposed outer surface is exposed to environmental effects such as moisture.

Figure 2:
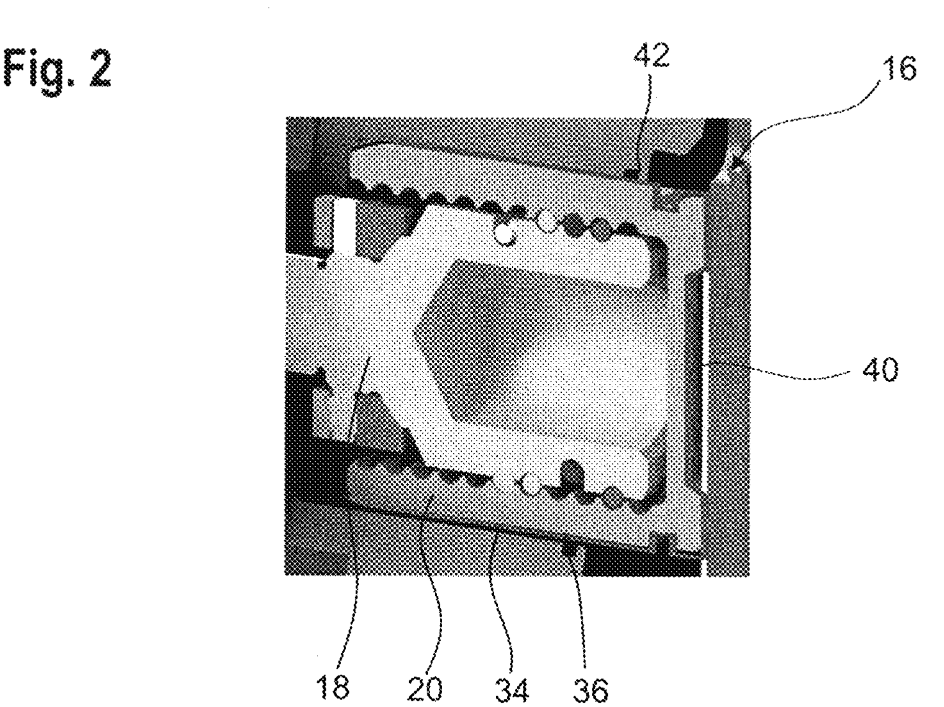
FIG. 2 shows another ball screw drive according to the disclosure for an actuator assembly.

In order to improve the resistance of the spindle nut 20 to environmental effects, anti-corrosion protection is provided according to the exemplary arrangement of the ball screw drive 16 which is illustrated in FIG. 2.

This is implemented by an anti-corrosion coating 34, which is applied to the outside of the spindle nut 20.

For greater clarity, the anti-corrosion coating 34 is shown with an exaggerated thickness.

In the exemplary arrangement according to FIG. 2, a circumferential wall 36 of the spindle nut or brake piston 20 is completely coated with the anti-corrosion coating 34.

In contrast, the spindle nut 20 is embodied without an anti-corrosion coating 34 on the radial inner surface 27, on which the thread groove 28 is also formed.

The spindle nut 20 is hardened at least in the region of the thread groove 28.

The spindle nut 20 is fully hardened and tempered, bainitized or inductively hardened, for example.

In the case of an inductively hardened spindle nut 20, the anti-corrosion coating 34 may be applied to the spindle nut 20 either before or after the hardening process.

Figure 3:
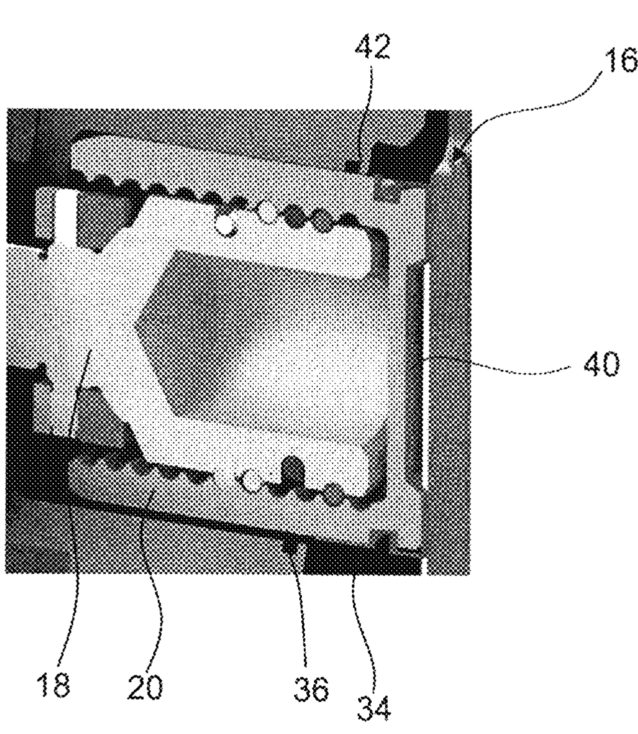
FIG. 3 shows a ball screw drive according to the disclosure for an actuator assembly according to another alternative arrangement.

FIG. 3 illustrates another exemplary arrangement of a ball screw drive 16.

The ball screw drive 16 illustrated in FIG. 3 differs from the ball screw drive 16 illustrated in FIG. 2 in that the anti-corrosion coating 34 on the circumferential wall 36 does not extend over the entire axial length of the spindle nut or brake piston 20.

Instead, the anti-corrosion coating 34 is applied only to the end face 40 of the spindle nut 20 and in a region of the circumferential wall 36 adjoining the end face 40.

Thus, the anti-corrosion coating 34 is provided only in the region which actually projects into the gap 14. This reduces the consumption of coating material.

In other words, the circumferential wall 36 is uncoated in a contact region of a sealing web 42 and in an axial end region of the spindle nut 20 remote from the gap 14. High surface pressures occur in these regions. Forming the corresponding regions without an anti-corrosion coating 34 ensures that the material of the spindle nut 20 can withstand the surface pressures which occur.

The invention claimed is:

1. A ball screw drive for an actuator assembly of a vehicle brake, comprising, a rotatably mounted recirculating ball screw spindle, on which a spindle nut open on one side is mounted, wherein at least one thread groove is formed on a circumferential surface of the recirculating ball screw spindle, and a corresponding thread groove is formed on an inner surface of the spindle nut, wherein a multiplicity of balls is guided in the thread grooves in such a way that rotation of the recirculating ball screw spindle brings about axial movement of the spindle nut along a rotational axis of the recirculating ball screw spindle, wherein the spindle nut is manufactured from rolling bearing steel or from C steel and is hardened at least in a region of the threaded groove; and wherein the spindle nut has an anti-corrosion coating on an outside surface, the coating being applied to at least an end face and a region of a circumferential wall adjoining the end face, wherein the anti-corrosion coating is absent from at least one axial end region of the spindle nut remote from an end face that is configured to engage a brake pad, and wherein the anti-corrosion coating is configured to resist environmental exposure in a brake caliper gap.

2. A brake piston for a vehicle brake which comprises a ball screw drive according to claim 1, wherein the spindle nut of the ball screw drive forms the brake piston.

3. The ball screw drive according to claim 1, wherein the circumferential wall of the spindle nut is completely coated with the anti-corrosion coating except for a portion of the axial end region that defines the open side of the spindle nut subjected to surface pressure.

4. The ball screw drive according to claim 3, wherein the spindle nut is hardened at least in a region of the thread groove.

5. The ball screw drive according to claim 1, wherein the spindle nut is fully hardened and tempered, bainitized or inductively hardened.

6. The ball screw drive according to claim 5, wherein a circumferential wall of the spindle nut is completely coated with the anti-corrosion coating except for the axial end region subjected to surface pressure.

7. A ball screw drive for an actuator assembly of a vehicle brake, comprising, a rotatably mounted recirculating ball screw spindle, on which a spindle nut open on one side is mounted, wherein at least one thread groove is formed on a circumferential surface of the recirculating ball screw spindle, and a corresponding thread groove is formed on an inner surface of the spindle nut, wherein a multiplicity of balls is guided in the thread grooves in such a way that rotation of the recirculating ball screw spindle brings about axial movement of the spindle nut along a rotational axis of the recirculating ball screw spindle, wherein the spindle nut has an anti-corrosion coating applied directly to an exterior surface of the spindle nut, the coating being limited to regions of the spindle nut exposed to the environment and excluded from a region remote from an end face of the spindle nut that is configured to engage a brake pad, and wherein the spindle nut is at least partially exposed to the environment during operation.

8. The ball screw drive according to claim 7, wherein a circumferential wall of the spindle nut is completely coated with the anti-corrosion coating except for an end face opposite the end of the spindle nut that is configured to engage the brake pad.

9. The ball screw drive according to claim 7, wherein the spindle nut is hardened at least in a region of the thread groove.

10. The ball screw drive according to claim 7, wherein the spindle nut has an anti-corrosion coating on at least on the end face configured to engage the brake pad and in a region of a circumferential wall adjoining the end face while being free of the anti-corrosion coating remaining regions.

* * * * *